United States Patent [19]

Bragg et al.

[11] Patent Number: 4,537,385
[45] Date of Patent: Aug. 27, 1985

[54] LOW EMISSION VALVE

[75] Inventors: Duncan D. Bragg, Simi Valley; Robert S. Wentworth, Temecula, both of Calif.

[73] Assignee: Borg-Warner Corporation, Chicago, Ill.

[21] Appl. No.: 434,291

[22] Filed: Oct. 14, 1982

[51] Int. Cl.³ .................. F16K 31/44; F16K 37/00
[52] U.S. Cl. .................. 251/214; 251/335.3; 137/553; 277/27; 277/65; 277/89
[58] Field of Search .................. 277/65, 88, 89, 3, 27; 251/214, 266, 335 A, 335 B; 137/553, 556

[56] References Cited

U.S. PATENT DOCUMENTS

| | | | |
|---|---|---|---|
| 684,191 | 10/1901 | Chatham | 137/553 |
| 2,246,277 | 6/1941 | Davidson | 277/65 |
| 2,652,223 | 9/1953 | Peters | 251/335 B |
| 3,260,530 | 7/1966 | Jelatis et al. | 277/65 |
| 3,333,856 | 8/1967 | Votik | 277/65 |
| 3,626,770 | 12/1971 | Lindberg et al. | 74/18.2 |
| 3,773,337 | 11/1973 | Adams | 277/89 |
| 3,979,104 | 9/1976 | La Coste | 251/214 |
| 4,087,097 | 5/1978 | Bossens et al. | 277/65 |
| 4,168,936 | 9/1979 | Scheller et al. | 277/27 |
| 4,307,745 | 12/1981 | McGee | 251/214 |

FOREIGN PATENT DOCUMENTS

| | | |
|---|---|---|
| 2061383 | 6/1971 | Fed. Rep. of Germany ........ 277/65 |
| 2635688 | 9/1978 | Fed. Rep. of Germany ... 251/335 B |

Primary Examiner—A. Michael Chambers
Attorney, Agent, or Firm—Aubrey L. Burgess

[57] ABSTRACT

A low emission valve assembly for use with volatile fluids and incorporating a pair of independent inner and outer metal bellows mechanical seal assemblies with means to compensate for thermal expansion of a liquid between the seals and which means transmits product pressure within the valve to the seals, so that the inner seal floats with a near zero pressure differential from outside to inside. The compensating means can be a pressure responsive bellows arrangement or a pressure response diaphragm arrangement.

7 Claims, 7 Drawing Figures

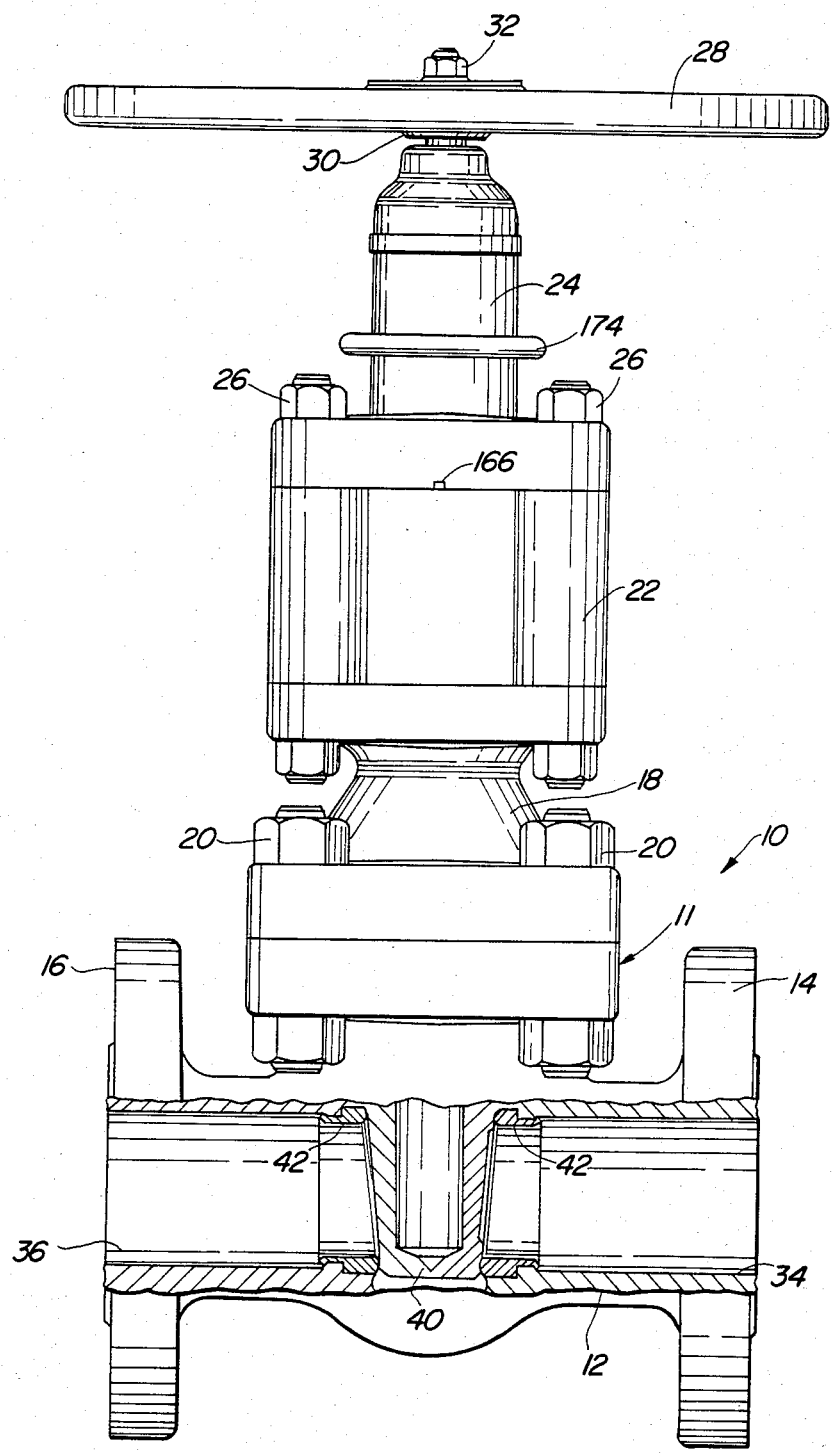

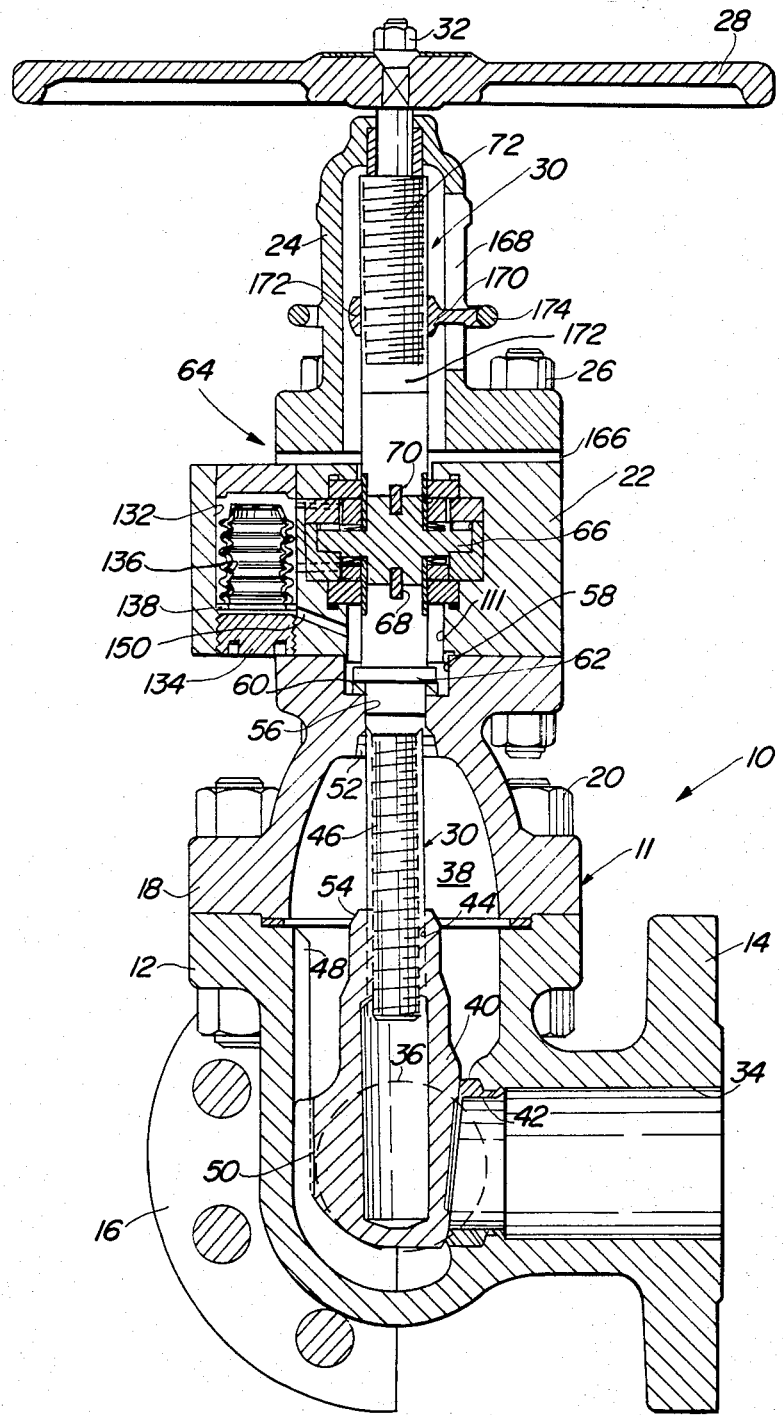

LOW EMISSION VALVE

BACKGROUND OF THE INVENTION

In the chemical processing industry and especially in refineries for processing petro-chemicals and hydrocarbons, emission of volatile organic hydrocarbon fluids and volatile organic hydrocarbon gases into the atmosphere is, and has been, a problem. Volatile organic compound emission regulations are currently being drafted by the Environmental Protection Agency.

One leakage source of volatile organic fluids into the atmosphere is from some or all of the valves used in the processing apparatus. Most of these valves are constructed with stem packings, as well known in the valve art. To prevent or materially reduce fluid leakage along the valve stems, the packing is tightened against the stems. To operate the valves, the stems must be turned and this induces high frictional contact of the packing and the stems, making the valves difficult to operate.

Leakage of radioactive steam along the stems of valves used in nuclear steam power plants has also been an environmental problem. To control such leakage in nuclear steam power plants it has been suggested in U.S. Pat. No. 3,979,104 to use bellows seals in butterfly valves. In the arrangement described in this patent, a buffer layer of uncontaminated steam having a pressure higher than the pressure of the contaminated steam is introduced into a seal chamber outwardly of the seal faces and the bellows to insure zero leakage of the contaminated steam past the seal device.

SUMMARY OF THE INVENTION

The present invention relates to an improved valve assembly for use in industries in which the emission of undesirable and/or contaminated fluids to the atmosphere has been a problem. To substantially eliminate such emissions along a valve stem to the atmosphere, the valve is constructed with a bellows-type mechanical seal arrangement surrounding the valve stem. The usual valve packing is eliminated.

In a preferred embodiment of the invention, the low emission valve comprises a gate valve with a nonrising, rotatable valve stem. One end of the valve stem is connected to the gate and the other end is connected to one end of a rotor which is located in a seal cavity in a seal section housing connected to the valve housing. The other end of the rotor is connected to an upper stem part to which an operating handle is connected. The valve stem is thus connected to the operating handle, so as to be rotatable therewith. The rotor has a pair of oppositely directed radial surfaces to which circular metal bellows are hermetically sealed. Each bellows is also hermetically sealed to a seal ring. Each bellows-connected seal ring has a lapped seal face contacting a lapped seal face of an opposed seal ring. Thus, there are two, spaced metal bellows mechanical seal devices. Each seal device, according to this invention is capable of functioning independently of the other.

A self-contained supply of a buffer fluid which is generally compatable with the product fluid but is non-reactive and non-corrosive is provided exteriorly of the seal devices. A third, closed end, metal bellows is positioned in the buffer fluid supply and serves to compensate for thermal expansion of the fluid and also, transmits pressure within the valve housing to the seal device located furtherest from the valve gate. A needle bearing in the seal cavity supports the seal rotor against forces from closing the valve and also against hydraulic loads, while a bushing in the seal cavity provides for piloting and retaining the rotor in its position.

In another preferred embodiment of the invention, a flexible, metal diaphragm replaces the third metal bellows and performs the same functions as the replaced third bellows.

Other aspects of the invention will become apparent to one skilled in the art, as the description progresses.

BRIEF DESCRIPTION OF THE DRAWINGS

FIG. 1 is a side view of a preferred embodiment of the low emission valve of this invention with parts broken away to show some details;

FIG. 3 is a sectional view of the valve of FIGS. 1 and 2 taken on line 3—3 of FIG. 2;

DESCRIPTION OF THE PREFERRED EMBODIMENT

Figure 2:
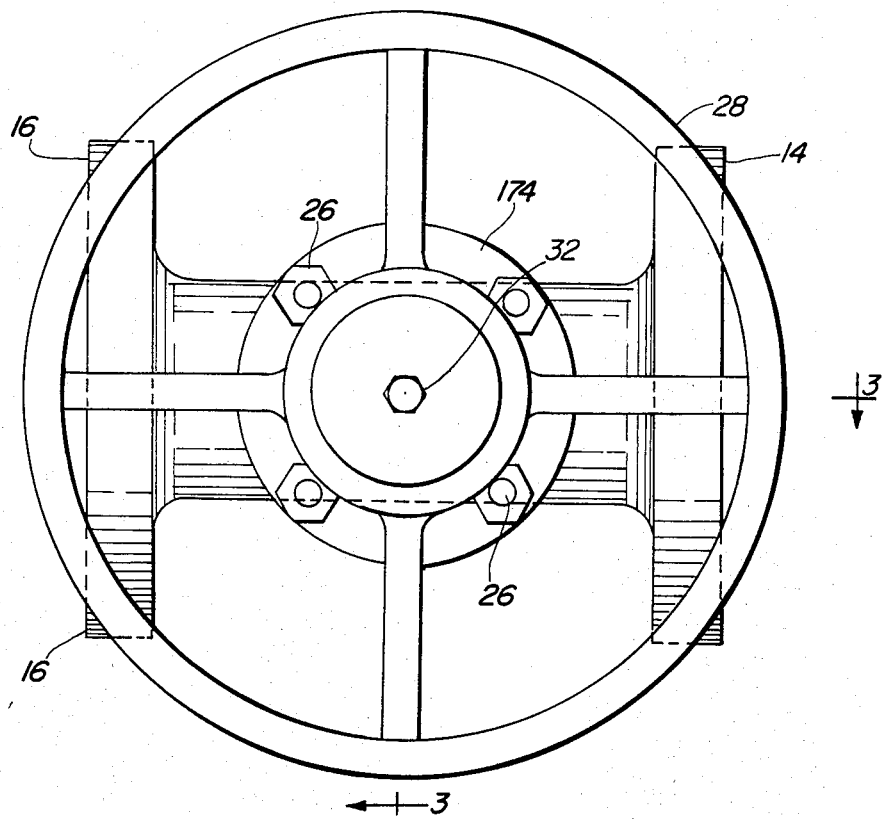
FIG. 2 is a top view of the valve of FIG. 1.

FIGS. 1 and 2 of the drawing illustrates the general arrangement of a low emission valve 10 constructed according to this invention. The valve 10 comprises, generally, a valve housing 11 constructed of a body 12 having inlet and outlet flanges 14 and 16 for connection with suitable piping (not shown), and a bonnet 18 bolted by bolts 20 to the body 12. A mechanical seal section housing 22 is bolted to the bonnet 18 and to a yoke 24 by bolts 26. An operating handle 28 for the valve is connected to a valve stem assembly 30 by nut 32. Suitable gaskets are provided at joints as necessary. The inlet and outlet flanges surround inlet and outlet passages 34 and 36.

The body 12 and the bonnet 18, as illustrated in FIG. 3, define a valve chamber 38 in which is disposed a gate 40. To close the valve, the gate 40 is moved downwardly to seat on valve seats 42, 42 in the inlet and outlet passages 34 and 36 (see FIG. 1). The gate is vertically movable, and is formed with internal threads 44 mating with a threaded, rotatable lower stem part 46 of the stem assembly 30. A spline or key 48 formed in the body 12 is engaged by a slot 50 in the gate 40 to guide the gate in its vertical movement and to prevent rotation of the gate, thus insuring proper seating of the gate 40 on the seats 42 when the valve is closed. The upper portion of the cavity 38 is in the bonnet 18 and is formed with a back seat 52 upon which the upper terminal end 54 of the gate 40 can seat when the valve is wide open, i.e., when the gate is in its uppermost position. This back-seat arrangement provides a means for sealing-off the valve chamber, so that the mechanical seal housing 22 and the parts therein can be removed for repair and/or replacement. The bonnet 18 has a central opening 56 through which the lower stem part 46 passes, and is formed with a cavity 58 to receive an annular thrust bearing 60. The thrust bearing 60 is engaged by an enlarged collar 62 of the lower stem part 46.

Figure 4:
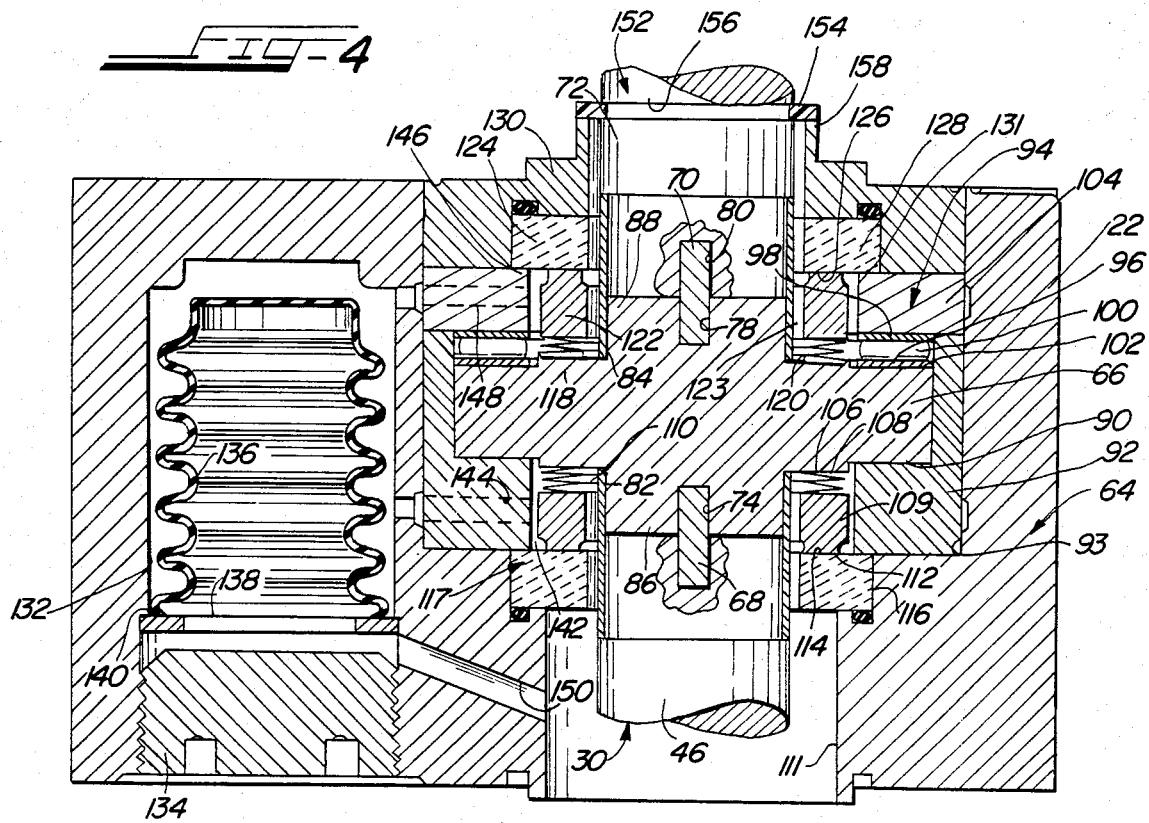
FIG. 4 is an enlarged sectional view of the mechanical seal arrangement illustrated in FIG. 3.

The mechanical seal section housing 22 is best illustrated in FIG. 4. The mechanical seal section housing contains a seal assembly 64 comprising a circular rotor 66 connected by a key 68 to the lower stem part 46 and by a key 70 to an upper stem part 72. The key 68 is received in keyways 74 and 76 in the rotor and lower stem part, and the key 70 is received in keyways 78 and 80 in the rotor and upper stem part. Sleeves 82 and 84 surround, respectively, a cylindrical lower part 86 of the rotor and the lower stem part, and a cylindrical upper part 88 of the rotor and the upper stem part. The sleeves 82 and 84 insure alignment of the upper and lower stem parts 72 and 46 and containment of the drive keys 68 and 70.

The rotor 66 is positioned in and supported at a lower surface 90 by an annular bushing 92 which is received in a seal cavity 93 in the housing 22. The rotor is supported against hydraulic loads by a needle bearing 94. The needle bearing 94 comprises a pair of opposed races 96 and 98 with a plurality of needles 100 therebetween. The race 96 is located on an upper surface 102 of the rotor while the race 98 is connected to an annular member 104 which forms a closure member for the rotor support bushing 92.

Inwardly of the bushing 92 and connected to a lower surface 106 of the rotor 66 is a first metal bellows 108 to which is also connected a lower seal ring 109. The bellows 108 and seal ring 109 define with the stem sleeve 82 a lower inner zone or chamber 110. The zone or chamber 110 opens into a bore 111 in the housing 22 in which fluid from the valve cavity 38 passes along the stem part 44. Thus the cavity 111 is at product pressure. The seal ring 109 has a lapped seal face 112 which engages a lapped seal face 114 of a seal ring 116 supported in the seal housing 22. The rotor 66, bellows 108, and seal rings 109 and 116 thus define an inner or lower mechanical seal 117. A second metal bellows 118 is connected to an upper surface 120 of the rotor 66 and also to an upper seal ring 122. The bellows 118 and seal ring 122 also define with the stem sleeve 84 an upper inner zone or chamber 123. The zone or chamber 123 opens essentially into the atmosphere and is at atmospheric pressure. The seal ring 122 has a lapped seal face 124 which engages a lapped seal face 126 of a seal ring 128 supported by the closure member 104 and by a top closure 130 for the seal housing 22 which surrounds the upper stem part 72. The rotor 66, bellows 118 and seal rings 122 and 128 thus define an outer or upper mechanical seal 131. The mechanical seals 117 and 131 are for the most part static seals; the relative rotation between seal rings occurs only when the valve stem is rotated.

The metal bellows 108 and 118 can be made of stainless steel, brass, or other metals, can be of integral corrugations, or can be formed by brazing a plurality of annular plates alternately together at their inner and outer circumferences, as known in the art. In any event the bellows are of such lengths and stiffness to resiliently urge the opposing seal rings and their seal faces toward one another.

Because of the shape of the rotor and its supporting bushing 92, the lower seal 117 is independent of the upper seal 131.

The mechanical seal housing 22 also has a cavity 132 closed by a closure member or plug 134, which cavity contains a third metal bellows 136. The bellows 136 is closed at its upper end and is connected at its lower end to a ring 138 abutting a shoulder 140 in the cavity 132. The ring 138 and the shoulder fixedly position the lower end of the bellows in the cavity 132. The cavity 132 communicates with an annular cavity 142 located around the lower mechanical seal 117 by a passage 144, and also with an annular cavity 146 located around the upper mechanical seal 131 by a passage 148. The space between the bellows 136 and the walls of the cavity 132 and the cavities 142 and 146 are completely filled with a buffer fluid. The buffer fluid is selected to be generally compatable with the product fluid but to be both non-reactive and non-corrosive. Various oils can be used as the buffer fluid.

The interior of the bellows 136 communicates with the bore 111 of the seal housing 22 and thus the valve chamber 38 by a passage 150. The bellows 136 functions to compensate for thermal expansion of the fluid between the seals and also transmits the pressure of the product fluid within the valve to the cavities 142 and 146 associated with the lower and upper seals 117 and 131. Because the lower or inner seal 117 is exposed to substantially the same pressure on opposite sides, i.e., in the seal cavities 110 and 142, the seal floats with a substantially zero pressure differential thereacross. However, there is a finite pressure differential across the faces of the upper or outer seal 131 because the pressure in the inner cavity 123 is essentially atmospheric while the buffer fluid in the cavity 146 is at a pressure above atmospheric.

The yoke 24 provides a cover for a dust proof water tight seal 152 to protect the mechanical seal arrangement from entrance of foreign matter. The seal 152 comprises an O-ring seal 154 fitting into a groove 156 in the upper stem part 72 and abutting a cylindrical extension 158 of the top closure 130. This seal permits some leakage of air into the inner seal cavity 123.

Drainage slots 166 are provided in the yoke 24 to release any fluid from the space between the yoke 24 and the stem part 72. The yoke 24, see FIG. 3, is constructed with a vertical slot 168 through which extends a part 170 of a position indicator 172 threadably received on the upper stem part 72. A ring 174 is connected to the part 170 and surrounds the yoke 24. The position indicator is prevented from rotating because of the part 170 engaging the sides of the slots 168. The upper and lower ends of the slot 168 indicate the open and closed positions of the gate 40 and can be so marked with suitable indicia. As the upper stem part 72 rotates, the position indicator travels therealong and the position of the ring 174 indicates the position of the gate 40 in the valve chamber 38.

In the event of failure of the upper seal device 131 because of the pressure differential thereacross, the lower seal device 117 will survive because of the substantially zero pressure differential thereacross. The mechanical seal assembly including the housing 22 can be removed from the valve for repair or replacement, even when the valve is operational. This is possible by moving the gate 40 to its uppermost position, so that the end 54 seats on the seat 52, and then removing the yoke and upper stem part and then the housing 22.

Figure 5:
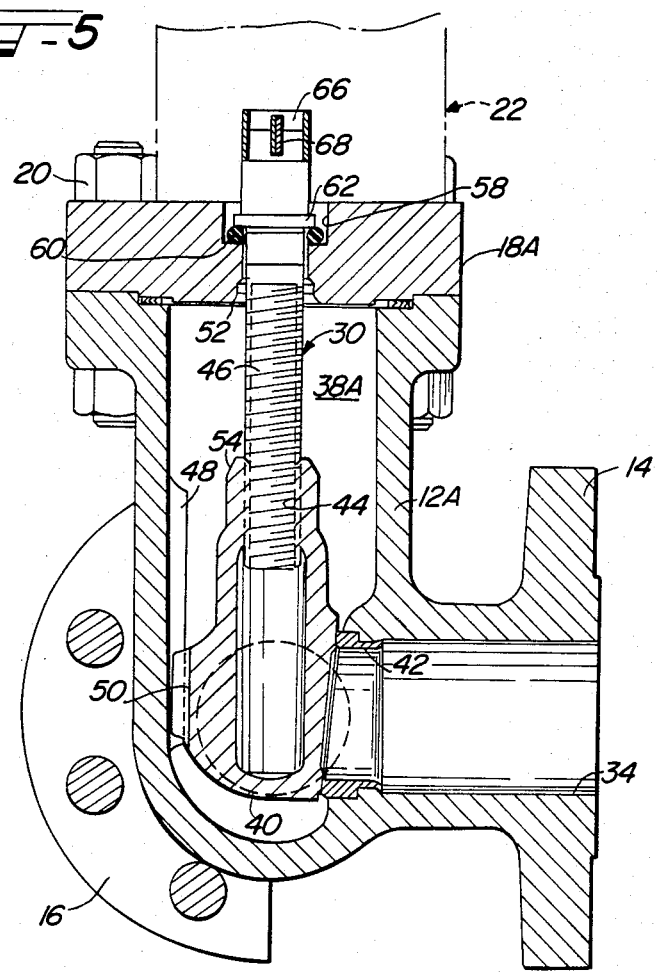
FIG. 5 is a partial sectional view similar to FIG. 3 and showing an alternative low emission valve construction.

FIG. 5 illustrates a portion of an alternative construction of a valve according to this invention and is similar to the lower portion of FIG. 3. This construction is generally used in large size valves and differs from the embodiment illustrated in FIG. 3 by having a flat bonnet 18A bolted to the valve body 12A, so that the valve cavity 38A is located entirely within the body 12A. The construction of the remainder of the valve and the mechanical seal assembly are essentially the same as that illustrated in FIG. 3.

Figure 6:
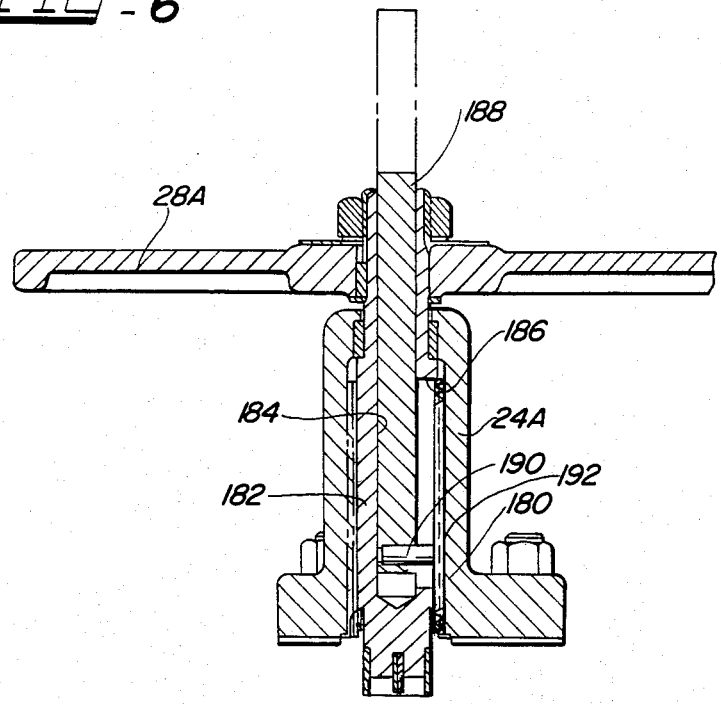
FIG. 6 is a partial sectional view of an alternative stem, and yoke arrangement for a low emission valve according to this invention.

FIG. 6 illustrates an alternative yoke and upper stem arrangement which makes the valve similar to a rising stem type. The yoke 24A is internally threaded at 180 and contains an upper stem part 182 which has an internal bore 184 and an elongated vertical slot 186, the stem part 182 being connected to the handle 28A. A rod 188 with an attached threaded follower 190 is received in the bore 184. The follower 190 has a threaded portion 192 mating with the internal threads 180 of the yoke 24A. As the handle 28A and the stem part 182 are turned, the rod 188 moves up or down to indicate the position of the gate in the valve. The remainder of the assembly, i.e., mechanical seal assembly and the valve are essentially the same as in FIGS. 3 or 6, as the case may be.

Figure 7:
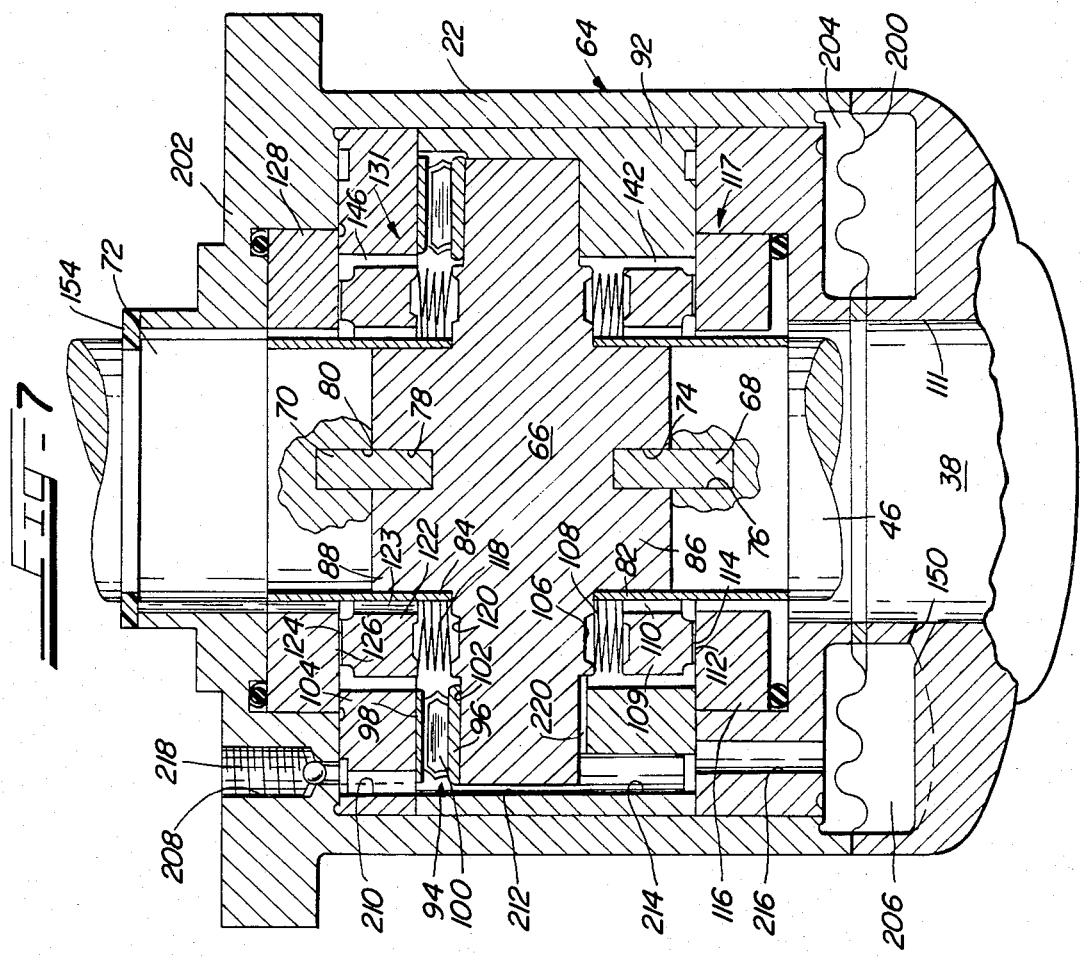
FIG. 7 is an enlarged sectional view similar to FIG. 4 and showing an alternative construction of the mechanical seal arrangement of this invention.

The alternative mechanical seal assembly 64 illustrated in FIG. 7 differs mainly from that illustrated in FIGS. 3 and 4 by the substitution of a metal diaphragm 200 for the bellows 136 and results in a more compact assembly while substantially retaining the essential functions of the before described assembly. Corresponding parts in FIG. 7 are identified with the same reference characters as in FIG. 4, although the description which follows is generally limited to the differences in structured arrangement of the two embodiments. The seal assembly 64, FIG. 7 comprises seal section housing 22 containing rotor 66 which is connected as illustrated and previously described with reference to FIGS. 3 and 4.

The lower part of housing 22 has a cavity 204 over which is located the diaphragm 200, constructed of a metal such as that used to construct one or both of the bellows 108 and 118. The upper end of the bonnet also has a cavity 206 opening to the opposite side of the diaphragm 200. The cavity 206 communicates with the valve cavity 38 by passage 150. The cavity 204 is filled with a buffer fluid which is generally compatible with the product fluid but is non-reactive and noncorrosive through an inlet 208 in the housing part 202, a passage 210 in member 104, a passage 212 in rotor 66, a passage 214 in bushing 92 and a passage 216 in housing 22. The buffer fluid completely fills the various passages and cavities and the inlet 208 is closed by a plug 218. Buffer fluid flows into the cavity 146 between the needle bearings 100 and into the cavity 142 through a passage 220 in the bushing 92. The diaphragm 200, like the bellows 136 of the FIG. 4 embodiment serves to compensate for thermal expansion of the fluid between the seals and also transmits the pressure of the product fluid within the valve to the cavities 142 and 146 associated with the lower and upper seals 117 and 131. The lower or inner seal 117 thus floats with a substantially zero pressure differential thereacross, while there is a finite pressure differential across the faces of the upper or outer seal 131.

One of the seal rings of each seal device can be made of ceramic, tungsten carbide and the like while the other ring can be made of a stainless steel or hard-faced alloy. The rotor is generally a weldable or stainless steel. Of course, the materials are selected so that they do not react with the product fluid.

While the invention has been described as comprising a gate valve, it is to be understood that the mechanical seal assembly is usable with other valve types without departing from the spirit of the invention.

We claim:

1. A valve assembly for a fluid system, said assembly having a rotatable stem means connected to a movable member located in a valve housing, said member being movable to control the flow of a product fluid through said housing, and a mechanical seal assembly having contacting seal faces for reducing and substantially preventing the escape of product fluid along said stem means and across said contacting seal faces to the exterior of said valve assembly, said mechanical seal assembly comprising:

a rotor having upper and lower surfaces and connected to said stem means for rotation therewith;

an upper pair of seal rings with contacting surfaces surrounding said stem means, one of said upper seal rings being fixed with respect to said rotor;

a lower pair of seal rings with contacting surfaces surrounding said stem means, one of said lower seal rings being fixed with respect to said rotor;

generally cylindrical bellows connecting the others of said seal rings to said upper and lower surfaces of said rotor and resiliently urging the connected seal rings toward their corresponding fixed seal rings; said bellows each surrounding said stem means and each defining a pair of zones, one zone of which is located interiorly of each bellow and the other zone of which is located exteriorly of each bellow, the exteriorly located zone also being defined by a portion of said rotor;

a source of buffer fluid;

means to supply buffer fluid to each of said exteriorly located zones; and means controlled by the pressure of said product fluid in said valve housing to pressurize said buffer fluid in one of said exteriorly located zones to a pressure above that in one of said exteriorly located zones and in the other of said exteriorly located zones to a pressure substantially equal to that in the other of said interiorly located zones.

2. A valve assembly as recited in claim 1, further comprising a bushing supporting said rotor, said bushing separating said exteriorly located zones and passages communicating said exteriorly located zones with said source of buffer fluid.

3. A valve assembly as recited in claim 1 in which means are provided to communicate said interiorly located zones with the atmosphere.

4. A valve assembly as recited in claim 1, further comprising a bushing supporting said rotor, said bushing having passages therein comprising said means to supply said buffer fluid to each of said exteriorly located zones.

5. A valve assembly for a fluid system, said assembly having a rotatable stem means connected to a movable number located in a valve housing, said member being movable to control the flow of a product fluid through said housing, and a mechanical seal assembly having contacting seal faces for reducing and substantially preventing the escape of product fluid along said stem means and across said contacting seal faces to the exterior of said valve assembly, said mechanical seal assembly comprising:

a rotor having upper and lower surfaces and connected to said stem means for rotation therewith;

a first pair of seal rings having contacting seal faces surrounding said stem means, one of said first pair of seal rings being fixed with respect to said rotor and said stem means;

a second pair of seal rings having contacting seal faces surrounding said stem means, one of said second pair of seal rings being fixed with respect to said rotor and stem means;

generally cylindrical bellows connecting the others of said first and second pairs of seal rings respectively to said upper and lower surfaces of said rotor and resiliently urging said others of said seal rings toward the corresponding fixed seal ring;

means controlled by the pressure of said product fluid in said valve housing to maintain a substantially zero fluid pressure differential across the contacting seal faces of said second pin of said seal rings; said pressure controlling means comprising a pressure response bellow means immersed in a buffer fluid which is different from the product fluid, said buffer fluid being on one side of said contacting seal faces and the product fluid being on the other side of said contacting seal faces.

6. A valve assembly as recited in claim 5, in which the pressure different across the contacting seal faces of said first pair of seal rings in an inwardly direction is above zero.

7. A valve assembly for a fluid system, said assembly having a rotatable stem means connected to a movable number located in a valve housing, said member being movable to control the flow of a product fluid through said housing, and a mechanical seal assembly having contacting seal faces for reducing and substantially preventing the escape of product fluid along said stem means and across said contacting seal faces to the exterior of said valve assembly, said mechanical seal assembly comprising:

a rotor having upper and lower surfaces and connected to said stem means for rotation therewith;

a first pair of seal rings having contacting seal faces surrounding said stem means, one of said first pair of seal rings being fixed with respect to said rotor and said stem means;

a second pair of seal rings having contacting seal faces surrounding said stem means, one of said second pair of seal rings being fixed with respect to said rotor and seal stem means;

generally cylindrical bellows connecting the others of said first and second pairs of seal rings respectively to said upper and lower surfaces of said rotor and resiliently urging said others of said seal rings toward the corresponding fixed seal ring;

means controlled by the pressure of said product fluid in said valve housing to maintain a substantially zero fluid pressure differential across the contacting seal faces of said second pin of said seal rings; said pressure controlling means comprising a pressure response diaphragm subject to a buffer fluid on one side and the product fluid on the other side.

* * * * *

UNITED STATES PATENT OFFICE
CERTIFICATE OF CORRECTION

PATENT NO. : 4,537,385
DATED : August 27, 1985
INVENTOR(S) : DUNCAN DOUGLAS BRAGG and ROBERT S. WENTWORTH It is certified that error appears in the above-identified patent and that said Letters Patent are hereby corrected as shown below:

Column 6, line 36, cancel "exteriorly" and insert
-- interiorly --.

Column 6, line 55, cancel "number" and insert -- member --.

Column 7, line 4, cancel "seal" and insert -- said --.

Column 7, line 13, cancel "pin" and insert -- pair --.

Column 7, line 21, cancel "different" and insert
-- differential --.

Column 7, line 26, cancel "number" and insert -- member --.

Column 8, line 15, cancel "seal" and insert -- said --.

Column 8, line 24, cancel "pin" and insert -- pair --.

Signed and Sealed this

Twelfth Day of November 1985

[SEAL]

Attest:

DONALD J. QUIGG

Attesting Officer

Commissioner of Patents and Trademarks